(12) United States Patent
Bender et al.

(10) Patent No.: US 11,341,186 B2
(45) Date of Patent: May 24, 2022

(54) COGNITIVE VIDEO AND AUDIO SEARCH AGGREGATION

(71) Applicant: International Business Machines Corporation, Armonk, NY (US)

(72) Inventors: Michael Bender, Rye Brook, NY (US); Michael P. Shute, Niantic, CT (US); Siddhartha Sood, Indirapuram (IN); Evelyn R. Anderson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 16/445,570

(22) Filed: Jun. 19, 2019

(65) Prior Publication Data
US 2020/0401621 A1 Dec. 24, 2020

(51) Int. Cl.
*G06F 16/783* (2019.01)
*G06F 16/735* (2019.01)
(Continued)

(52) U.S. Cl.
CPC ...... *G06F 16/735* (2019.01); *G06F 16/24578* (2019.01); *G06F 16/71* (2019.01);
(Continued)

(58) Field of Classification Search
CPC ...... G06F 16/24578; G06F 16/70–787; G06K 9/00221–00315; G06K 9/00718;
(Continued)

(56) References Cited

U.S. PATENT DOCUMENTS

| 10,552,471 B1* | 2/2020 | Dandekar | G06F 16/535 |
| 2009/0190804 A1* | 7/2009 | Yokoi | H04N 9/8205 |
| | | | 382/118 |

(Continued)

FOREIGN PATENT DOCUMENTS

| CN | 105893510 A | 8/2016 |
| CN | 107590150 A | 1/2018 |
| WO | 2018176017 | 9/2018 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
(Continued)

*Primary Examiner* — Robert W Beausoliel, Jr.
*Assistant Examiner* — Nirav K Khakhar
(74) *Attorney, Agent, or Firm* — Heslin Rothenberg Farley & Mesiti P.C.; Michael A. Petrocelli, Esq.

(57) ABSTRACT

A method, computer program product, and a system where a processor(s) obtains a video from a user, via a client, and segments the video into temporal shots that comprise a timeline of the video. The processor(s) cognitively analyze the video, by applying an image recognition algorithm to identify image entities in each temporal shot of the video and by applying a data structure comprising a user profile of the user to the temporal shots, to identify personal entities in each temporal shot of the video. The program code generates a search index for the video, utilizing the user entities (image entities and personal entities), where each entry of the search index is a given user entity and a linkage to a given temporal shot and the linkage indicates a location of the given user entity in the timeline of the video.

20 Claims, 9 Drawing Sheets

(51) Int. Cl.
  *G06F 16/71*     (2019.01)
  *G06F 16/2457*   (2019.01)
  *G06K 9/62*      (2022.01)
  *G06F 16/738*    (2019.01)
  *G06V 20/40*     (2022.01)
  *G10L 15/26*     (2006.01)
  *G06V 30/10*     (2022.01)

(52) U.S. Cl.
  CPC .......... *G06F 16/738* (2019.01); *G06F 16/784* (2019.01); *G06F 16/7837* (2019.01); *G06K 9/6253* (2013.01); *G06V 20/41* (2022.01); *G06V 20/49* (2022.01); *G06V 30/10* (2022.01); *G10L 15/26* (2013.01)

(58) Field of Classification Search
  CPC ............. G06K 9/00765; G06K 9/6253; G06K 2009/00322–00328; G06K 2209/01; G10L 15/26
  See application file for complete search history.

(56) References Cited

U.S. PATENT DOCUMENTS

| | | | |
|---|---|---|---|
| 2015/0134668 A1* | 5/2015 | Popovich | G06F 16/7867 707/741 |
| 2016/0004911 A1* | 1/2016 | Cheng | H04N 21/44008 382/159 |
| 2017/0070783 A1* | 3/2017 | Printz | G06F 16/44 |
| 2017/0358302 A1* | 12/2017 | Orr | G06F 16/433 |
| 2018/0032796 A1* | 2/2018 | Kuharenko | G06F 16/5838 |
| 2018/0035152 A1* | 2/2018 | Jassin | H04N 21/23418 |
| 2018/0285652 A1* | 10/2018 | Dey | H04N 5/23219 |
| 2018/0343376 A1* | 11/2018 | Choo | H04N 5/23219 |
| 2019/0198057 A1* | 6/2019 | Cheung | G06K 9/6215 |
| 2019/0313058 A1* | 10/2019 | Harrison | G06T 7/194 |
| 2020/0134315 A1* | 4/2020 | Trim | G06K 9/033 |

OTHER PUBLICATIONS

International Search Report and Written Opinion of International Application No. PCT/IB2020/054841, dated Jul. 29, 2020, 8 pages.

\* cited by examiner

COGNITIVE VIDEO AND AUDIO SEARCH AGGREGATION

BACKGROUND

As the sources and structure of data becomes more complex and diverse, the ability to search this data for specific information becomes more challenging. Certain data formats have inherent limitations when searched utilizing standard approaches and are therefore not considered search friendly. An example of a format that can be difficult to search is video because the parameters are difficult to articulate and even if articulated, the results can be difficult to find. For example, a user hoping to locate a specific image in vast video archives may have to engage in manual searching to locate the specific image and as the size of video archives increase, this task can prove particularly difficult and/or inefficient.

SUMMARY

Shortcomings of the prior art are overcome and additional advantages are provided through the provision of a method for generating a searchable index for one or more videos. The method includes, for instance: obtaining, by one or more processors, from a user, via a client, a video to upload to a repository accessible to the one or more processors; segmenting, by the one or more processors, the video into temporal shots, wherein the temporal shots comprise a timeline of the video; cognitively analyzing, by the one or more processors, the video, by applying an image recognition algorithm, to the video, to identify image entities in each temporal shot of the video; cognitively analyzing, by the one or more processors, by applying a data structure comprising a user profile of the user to the temporal shots, to identity personal entities in each temporal shot of the video; and generating, by the one or more processors, a search index for the video, utilizing the user entities, wherein the user entities comprise the image entities and the personal entities, wherein each entry of the search index comprises a given user entity, wherein the given user entity is selected from the user entities, and a linkage to a given temporal shot of the temporal shots, wherein the linkage indicates a location of the given user entity in the timeline of the video.

Shortcomings of the prior art are overcome and additional advantages are provided through the provision of a computer program product for generating a searchable index for one or more videos. The computer program product comprises a storage medium readable by a processing circuit and storing instructions for execution by the processing circuit for performing a method. The method includes, for instance: obtaining, by the one or more processors, from a user, via a client, a video to upload to a repository accessible to the one or more processors; segmenting, by the one or more processors, the video into temporal shots, wherein the temporal shots comprise a timeline of the video; cognitively analyzing, by the one or more processors, the video, by applying an image recognition algorithm, to the video, to identify image entities in each temporal shot of the video; cognitively analyzing, by the one or more processors, by applying a data structure comprising a user profile of the user to the temporal shots, to identity personal entities in each temporal shot of the video; and generating, by the one or more processors, a search index for the video, utilizing the user entities, wherein the user entities comprise the image entities and the personal entities, wherein each entry of the search index comprises a given user entity, wherein the given user entity is selected from the user entities, and a linkage to a given temporal shot of the temporal shots, wherein the linkage indicates a location of the given user entity in the timeline of the video.

Shortcomings of the prior art are overcome and additional advantages are provided through the provision of a system for generating a searchable index for one or more videos. The system comprises a memory, one or more processors in communication with the memory, and program instructions executable by the one or more processors via the memory to perform a method. The method includes, for instance: obtaining, by the one or more processors, from a user, via a client, a video to upload to a repository accessible to the one or more processors; segmenting, by the one or more processors, the video into temporal shots, wherein the temporal shots comprise a timeline of the video; cognitively analyzing, by the one or more processors, the video, by applying an image recognition algorithm, to the video, to identify image entities in each temporal shot of the video; cognitively analyzing, by the one or more processors, by applying a data structure comprising a user profile of the user to the temporal shots, to identity personal entities in each temporal shot of the video; and generating, by the one or more processors, a search index for the video, utilizing the user entities, wherein the user entities comprise the image entities and the personal entities, wherein each entry of the search index comprises a given user entity, wherein the given user entity is selected from the user entities, and a linkage to a given temporal shot of the temporal shots, wherein the linkage indicates a location of the given user entity in the timeline of the video.

Methods and systems relating to one or more aspects are also described and claimed herein. Further, services relating to one or more aspects are also described and can be claimed herein.

Additional features are realized through the techniques described herein. Other embodiments and aspects are described in detail herein and are considered a part of the claimed aspects.

In some embodiments of the present invention, applying the user profile comprises: monitoring, by the one or more processors, computing activities performed by the user, via the client, based on the client connecting, over a network, to one or more applications; analyzing, by the one or more processors, the computing activities performed by the user, in the one or more applications, to identify data comprising elements relevant to the user and relationships between the elements and the user; and generating, by the one or more processors, based on the analyzing, the data structure, wherein the data structure comprises the user profile.

In some embodiments of the present invention, applying the user profile further comprises: converting, by the one or more processors, non-textual elements in the video to textual content, for each temporal shot of the temporal shots; and identifying, by the one or more processors, in the textual content of each temporal shot, the elements relevant to the user and the relationships between the elements and the user, wherein the elements comprise the personal entities.

In some embodiments of the present invention, the method further includes: storing, by the one or more processors, the search index in an indexed repository.

In some embodiments of the present invention, the method further includes: obtaining, by the one or more processors, search parameters identifying one or more relevant user entities of the user entities in the search index; identifying, by the one or more processors, the relevant user entities; and searching, by the one or more processors, the video for the relevant user entities, wherein the searching comprises accessing the index repository to utilize the search index to locate the relevant user entities in the video.

In some embodiments of the present invention, the method further includes: formulating, responsive to the searching, by the one or more processors, search results, where the search results comprise the relevant user entities and for each relevant user entity, a location of the relevant user entity in the timeline, wherein the location comprises a start time and an end time.

In some embodiments of the present invention, formulating the search results comprises ranking the search results based on relevance to the search parameters.

In some embodiments of the present invention, the method further includes: generating, by the one or more processors, a search deliverable, the generating comprising: obtaining, by the one or more processors, a portion of the temporal shots from the video, wherein each temporal shot of the portion comprises the location of the relevant user entity in the timeline for each user relevant entity; and assembling, by the one or more processors, the portion of the temporal shots into a new video.

In some embodiments of the present invention, the method further includes: providing, by the one or more processors, the search deliverable to the user, via the client.

In some embodiments of the present invention, the assembling comprises assembling the portion of the temporal shots according to the ranking of the search results based on the relevance to the search parameters.

In some embodiments of the present invention, the new video comprises more than one individual new videos, and where the providing of the search deliverable comprises providing links to each of the individual new videos.

In some embodiments of the present invention, a format of the search parameters are selected from the group consisting of: text, voice, image, and video.

In some embodiments of the present invention, applying the image recognition algorithm comprises accessing an image metadata repository accessible to the one or more processors.

In some embodiments of the present invention, the non-textual elements comprise speech and audio, and wherein converting the elements comprises applying a speech to text processing algorithm to produce the textual content.

In some embodiments of the present invention, the non-textual elements comprise embedded text in images comprising the video, wherein converting the elements comprises executing an optical character recognition process on the embedded text to convert the embedded text to the textual content, wherein the one or more applications comprise a social media website, and wherein the elements relevant to the user comprise images posted by the user on a social media website and tags associated with the images.

In some embodiments of the present invention, the method further includes: prior to generating the search index, determining, by the one or more processors, a classification for the video, wherein obtaining the video from the user, via the client, further comprises obtaining the classification, from the user via the client; identifying, by the one or more processors, in the repository, another video uploaded by the user, wherein the classification of the other video is equivalent to the classification of the video; extracting, by the one or more processors, from a search index of the other video, user entities comprising the search index of the other video; searching, by the one or more processors, the video, for the user entities comprising the search index of the other video; and locating, by the one or more processors, a portion of the user entities comprising the search index of the other video in the video.

In some embodiments of the present invention, the user entities further comprise the portion of the user entities.

In some embodiments of the present invention, the method further includes: prior to generating the search index, generating, by the one or more processors, in a user interface of the client, an interface displaying the personal entities and respective linkages of the personal entities, wherein the interface comprises a point of entry by which the user can provide feedback; obtaining, by the one or more processors, the feedback from the user, provided via the interface; and updating, by the one or more processors, the user entities based on the feedback.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
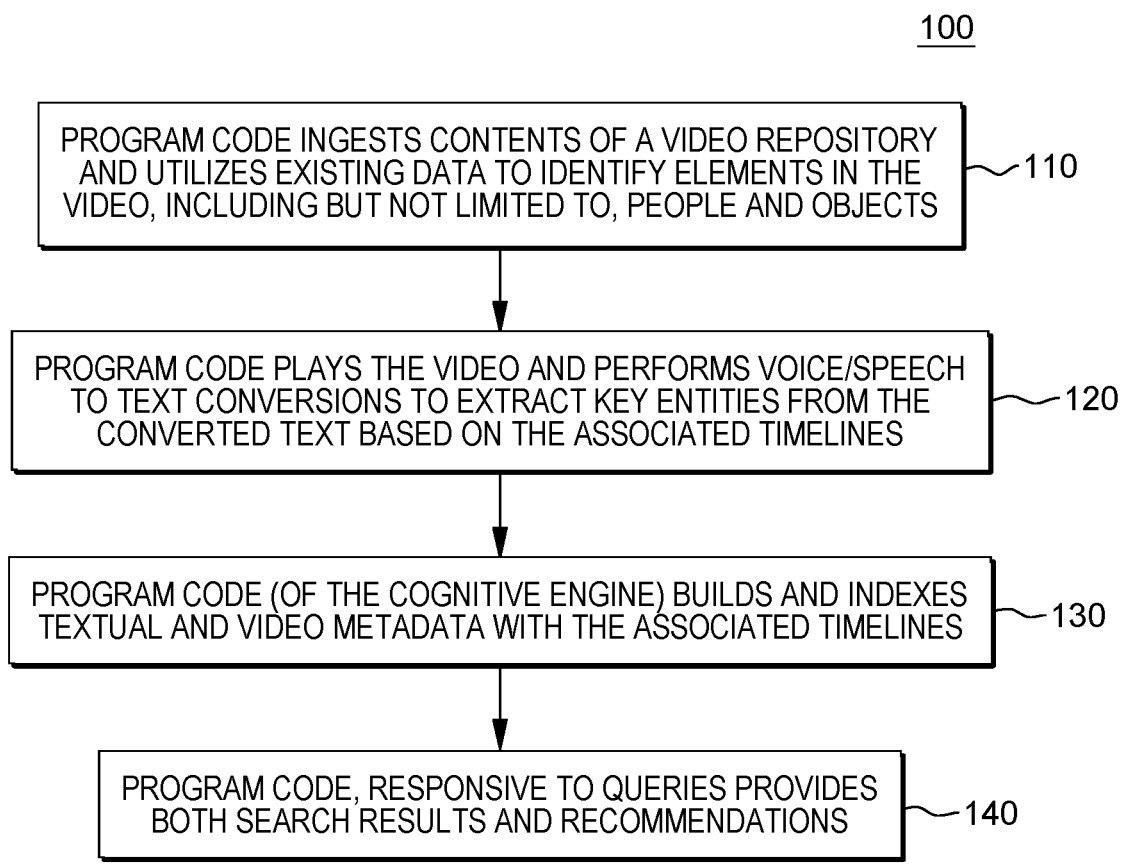
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
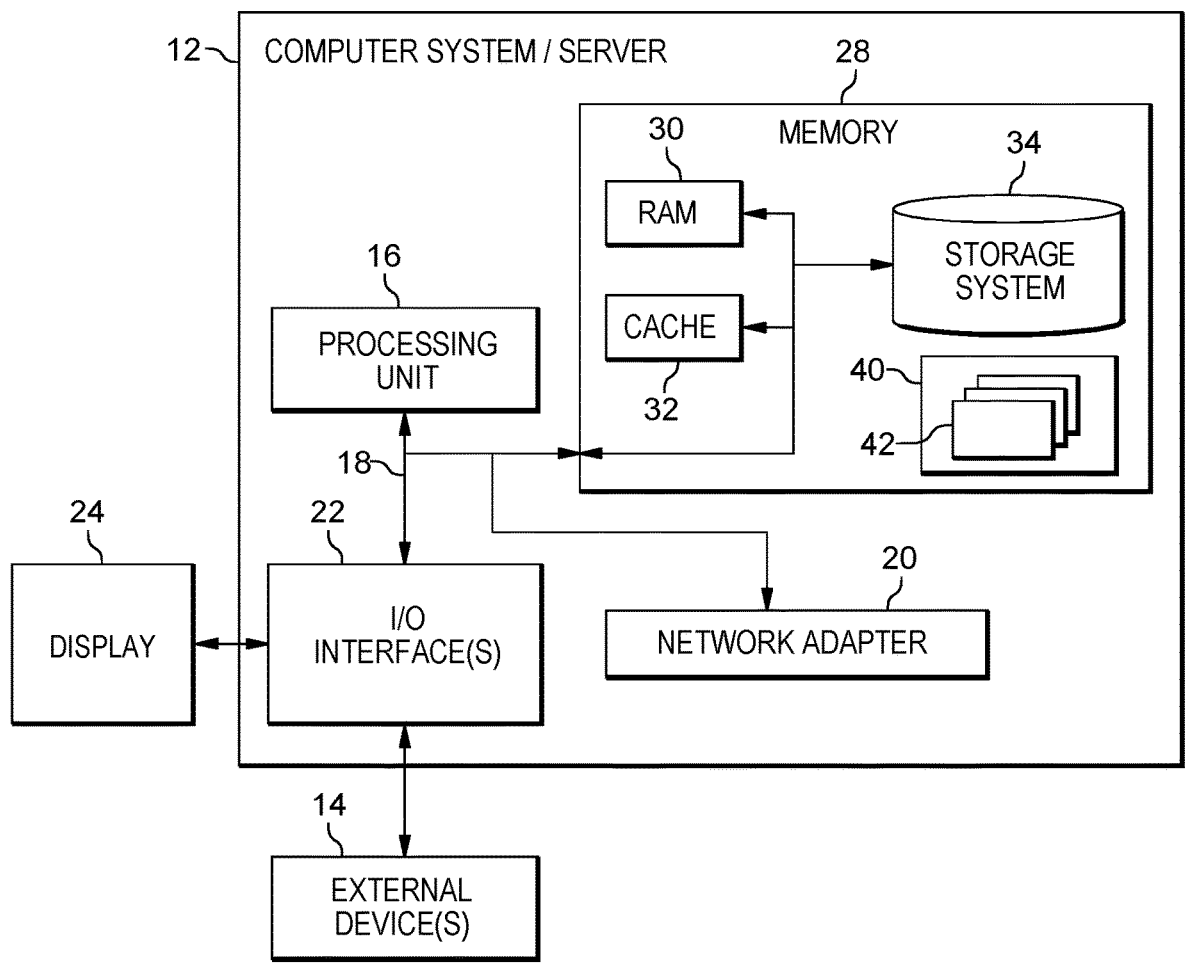
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, can be stored in memory 28.

As the amount of electronic data increases as does the need to be able to search this data and to locate desired content. Certain data formats, such as video, can be less search-friendly than other data formats, such as text. Media types that are less search-friendly can present challenges to the efficiency of overall systems when a search is attempted. For example, a user may desire to execute a search in videos on a video sharing platform where the parameters are likely not contained in the metadata uploaded by the video owner with the video (e.g., finding a movie where a particular actor is smiling). Another search which would present issues utilizing existing approaches would be a query for a particular configuration of a family member at a specified geographical location, within a library of family videos taken over a period of time (e.g., finding a video clip with a particular family member riding a horse at a particular geographic location, located in archived video spanning at least a year). Another search which would present various difficulties would be a search to locate all educational content within a space configured for use by a project team, for the duration of the project, and any impediments to access (e.g., finding educational content in a team room and prerequisites to watching the content). Still another search challenge would be for an ordered result for a particular purpose (e.g., finding an ordering for results that would create the result as a new video). Embodiments of the present invention directly address these search challenges, as well as others, by enabling searches that go beyond metadata and utilize cognitive analyses of data both inside and outside of the volumes being searched to provide comprehensive search results when parameters are historically challenging, as in the examples provided.

Embodiments of the present invention include a computer-implemented method, a computer program product, and a computer system where program code executing on at least one processing device: 1) integrates existing technology to identify an entity (e.g., person, object, element) or text within a video, tag the location, and enable indexing to retrieve the desired content; and 2) generates a cognitive engine to assess video or audio to machine learn and provide search aggregations to locate this desired content. In embodiments of the present invention, the program code performs cognitive searching of both video and/or audio data. In order to implement this cognitive search, the program code ingests the audio and/or video data and performs one or more of the following aspects: 1) the program code analyzes text and/or images in videos, which includes, but is not limited to, the program code converting video into temporal shots, and translating speech to text; 2) the program code tags locations within the videos, based on a user's social media data, which the program code accesses with the permission of the user; 3) the program code extracts metadata in the video content and relevant to the video content, including, but not limited to, user feedback and the aforementioned social media data; and 6) the program code links this extracted metadata to specific video fragments to build a search index. Once the program code has generated a search index (as part of ingesting the video and/or audio data) the ingested data can be more easily and effectively searched by a user. In response to a search executed by the user, program code can identify entities from the search index. In embodiments of the present invention, to execute a search, a user can supply as parameters, one or more of text, voice, images, and/or videos. Additionally, in some embodiments of the present invention, the program code can rank these identified entities as search results, responsive to the search executed by the user.

Embodiments of the present invention are inextricably tied to computing. As will be described herein, aspects of embodiments of the present invention address issues unique to computing by implementing an approach enabled by computing. Embodiments of the present invention include aspects that enhance electronic data in order to enable more comprehensive electronic searching of this data. Embodiments of the present invention include the training of machine learning algorithms to enable this enhanced searching capability. In some embodiments of the present invention, program code not only ingests electronic data that is difficult to search utilizing existing approaches (e.g., audio data, video data) in a manner that indexes the data to enable more comprehensive electronic searching, the program code also provides search results in more flexible formats, including, but not limited to, establishing an order from search responses to provide a single aggregated video response by stitching together extracted relevant sections (defined start/end time) from the video content being searched. These aspects, electronic indexing, searching, and result managements, are all inextricably related to computing. The program code enables the comprehensive searching of media that cannot be searched without the user of computing technologies and for at least this reason, aspects of some embodiments of the present invention are inextricably linked to computing.

Embodiments of the present invention are also inextricably linked to computing because the program code enables enhances searching of video repositories and provides accurate search results, in part, by generating and maintaining data structures that include knowledge bases for various users, as well as relationships between known entities in the knowledge bases. The program code obtains data for the data structures (and generates the data structures) based on taking advantage of the interconnectivity of various computing systems, including Internet of Things (IoT) devices and personalized computing devices (e.g., the digital wardrobe of the user). Thus, aspects of embodiments of the invention are inextricably tied to computing at least because they represent enhancements to a system that is native to computing and exploit a computing infrastructure or generate an original computing interface to provide this enhancement.

Embodiments of the present invention provide a practical application to a specific challenge, which is electronic searching of certain formats of electronic data. As described herein, in embodiments of the present invention, program code enables enhanced searching and/or enhanced search results, based on ingesting data in these difficult-to-search formats (e.g., audio, video) and indexing the data through cognitive analysis. The cognitive analysis is described herein and is one example of the integration of various aspects of embodiments of the present invention into a practical application.

Some embodiments of the present invention include aspects that provide significant advantages over existing electronic search-related approaches. For example, some existing approaches to searching video repositories involve increasing the speed at which a video can be played, to enable a faster viewing of the content. In some embodiments of the present invention, rather than rely on a faster playback mechanism to scroll more quickly through a video to find desired content (which is limited compared to what can be searched by program code in embodiments of the present invention) in embodiments of the present invention, program code performs a cognitive analysis of the content of the video repositories that includes, but is not limited to, converting speech and/or voice to data such that a user can search the repository for specific images, with parameters including, but not limited to text, voice, images, and/or videos. Another existing approach relies upon a user to narrate a video in order to provide textual content that can then be located in a search. This approach is extremely work-intensive and limiting, especially when given the potential size of a video repository. Some embodiments of the present invention provide advantages over this approach at least because program code performs automated cognitive video/audio analyses and through self-learning can provide enhanced indexing to enable image searches. Another existing approach divides a video into fragments so that the fragments can be individually searched, however, there is no additional logic in the repository as a whole that would enable image location by a searcher when the entirety of the repository is searched. Embodiments of the present invention provide a significant advantage over this fragmentation process by converting both speech and/or voice in video files and audio files to text such that the program code can utilize this text to locate portions of the video, including images, based on a user supplying search parameters, including but not limited to, text, voice, images, and/or videos. In general, aspects of some embodiments of the present invention provide advantages over existing search technologies by reducing the time utilized to search for information used for training on a specific subject or research when looking for content or images. This reduction in time reduces costs and improves productivity.

Figure 2:
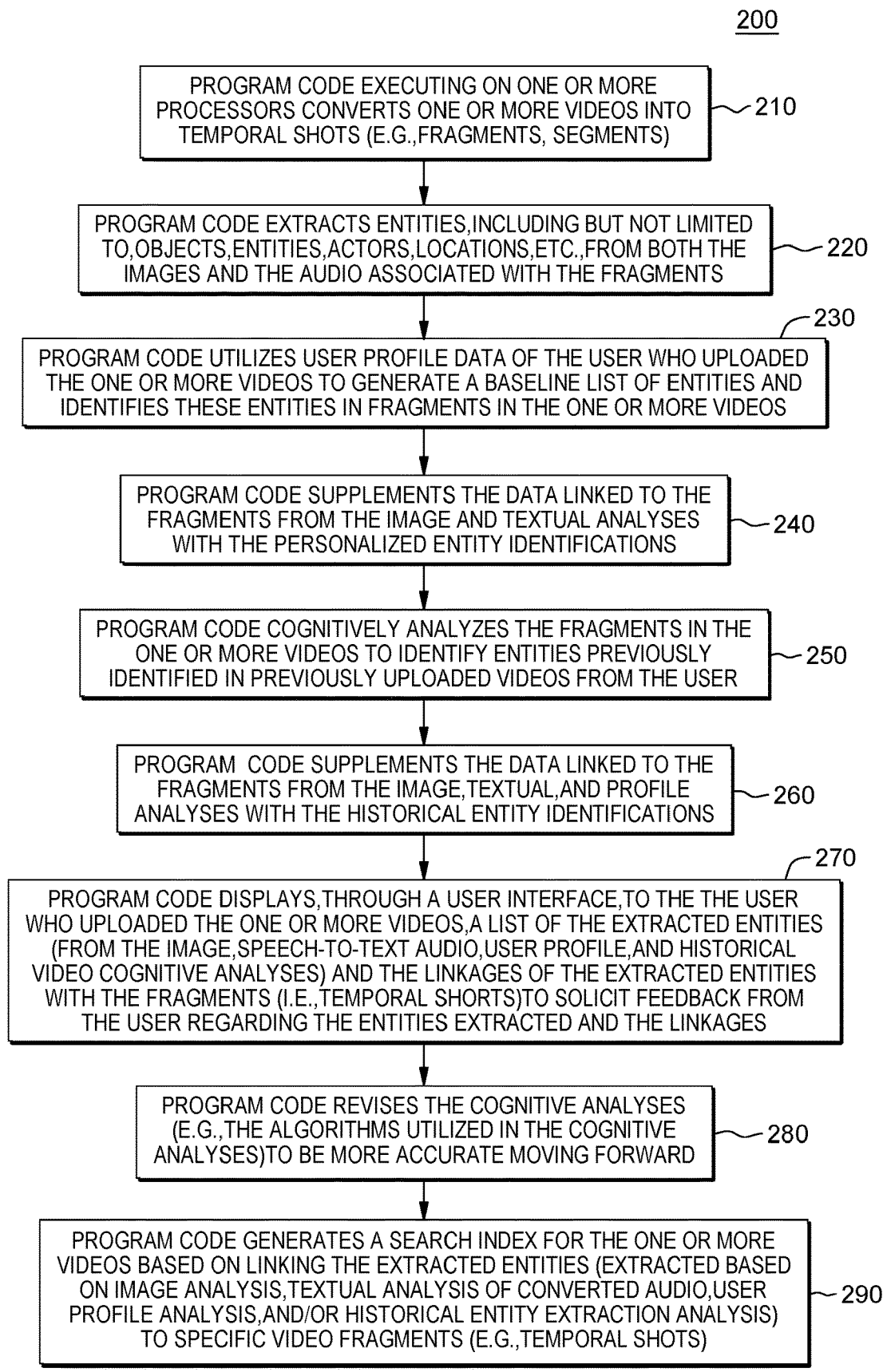
FIG. 2 is a workflow that illustrates certain aspects of some embodiments of the present invention.
Figure 4:
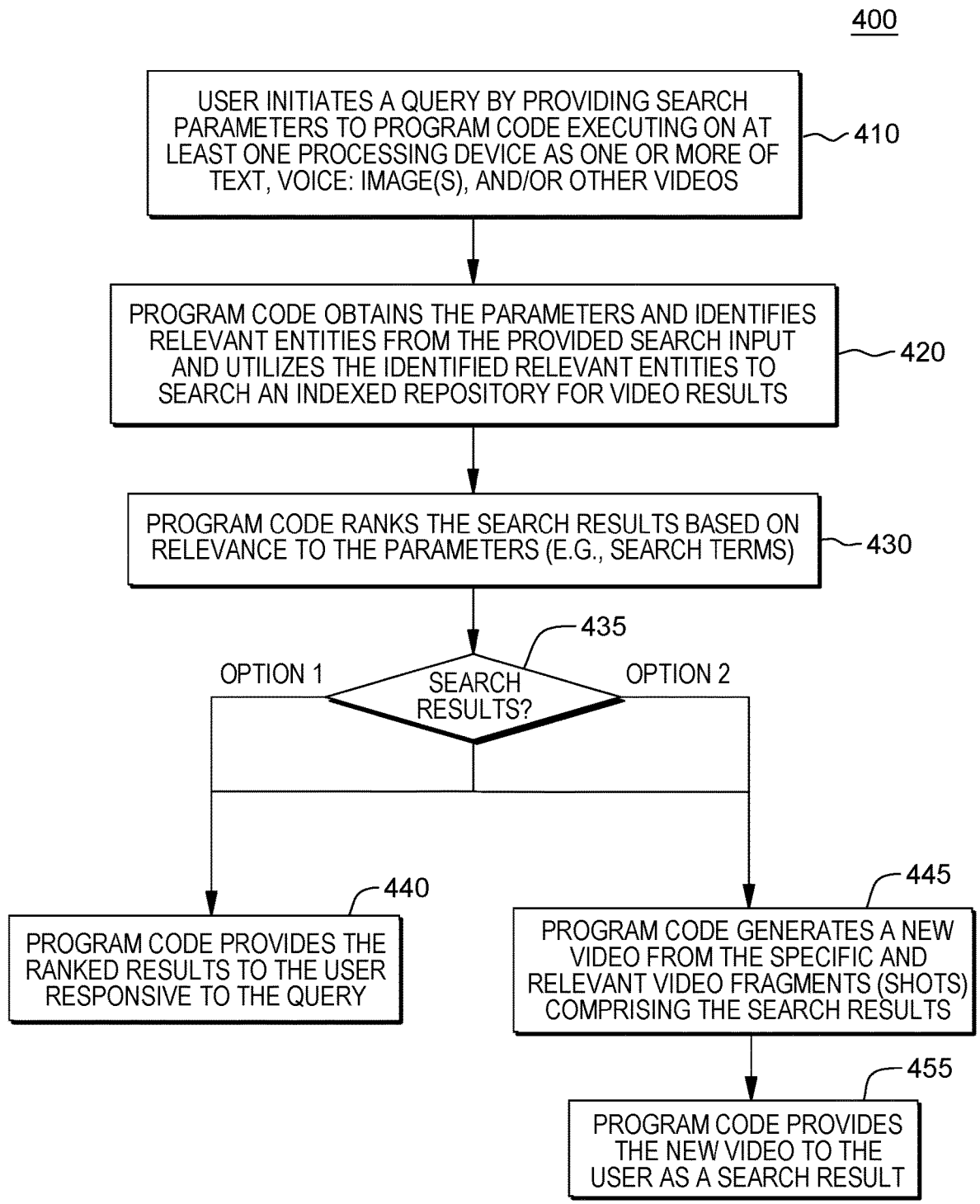
FIG. 4 is a workflow that illustrates certain aspects of some embodiments of the present invention.

FIG. 1 is a workflow 100 that provides an overview of certain aspects of some embodiments of the present invention. Further detail for aspects of these embodiments is provided in FIG. 2 and FIG. 4. FIG. 2 illustrates a workflow 200 in which videos are uploaded and FIG. 4 illustrates a workflow 400 related to searching the previously uploaded content. However, for illustrative purposes, this general overall workflow 100 is provided as FIG. 1.

Referring to FIG. 1, in some embodiments of the present invention, program code comprising a cognitive engine, executed by at least one processor, automatically indexes data contained in a video repository to enable object-specific searching in the repository. In order to generate an index for a repository, program code ingests contents of a video repository and utilizes existing data (e.g., data structures, social connection imaging and tags, video tags, social profiles, and/or an image repository) to identify elements in the video, including but not limited to, people and objects (110). In embodiments of the present invention, a user consents to the program code ingesting personal data, including but not limited to social profiles and any tagging within social media. Additionally, in some embodiments of the present invention, if the individuals identified are not the user, the program code can require consent from these individuals before identifying these individuals within the media.

In some embodiments of the present invention, the program code obtains this existing data by exploiting the connectivity of multiple systems and the prevalence of Internet of Things (IoT) devices and other personal computing devices. Based on obtaining existing data, the program code can generate a data structure for a given user and/or group of users (including the creator of video content) that the program code can utilize to inform the indexing of the content of the video. For example, the program code can generate a data structure for a given user through monitoring (with the permission of the user) usage of applications on the computing device utilized to execute a search client to search the video repository. For example, in some embodiments of the present invention, the program code can generate and continually update a data structure associated with a given user based on that user's digital wardrobe. In some embodiments of the present invention, the data structure can include various elements of a digital wardrobe of a given user or group or users that the program code can (cognitively) analyze when establishing the data structure. As understood by one of skill in the art, a digital wardrobe is a collection of data that can be understood as a unique identifier for a user. A user's digital wardrobe is comprised of all hardware and software that a user interacts with. For example, not only is a user's digital wardrobe comprised of all physical computing devices a user may utilize (e.g., personal computing device, IoT devices, sensors, personal health trackers, physical activity trackers, smart watches, digital thermostat, smart televisions, digital cameras, computerized exercise equipment, smart appliances, etc.), it is also comprised of any software a user utilizes (e.g., social media platforms, ecommerce applications, electronic media subscriptions, electronic media views, etc.). Because of the variety of devices and applications available, those of skill in the art accept that two individuals will not have the same digital wardrobe. Thus, an individual's digital wardrobe can be utilized as a unique identifier for the individual, which can aid the program code in providing contextualized data to utilize when indexing videos created by and/or featuring the user, that is not only personalized, but, possibly, unique to the user. In addition to identifying a user, data that comprises a digital wardrobe can be utilized to tailor additional applications, software, events, experiences, to fit the parameters and preferences to the user, based on extracting and analyzing this data from the user's digital wardrobe. In embodiments of the present invention, the program code can extract elements of a user's digital wardrobe to generate a data structure that the program code utilizes to generate a data structure to embed within video in a video repository, to enable granular searching of the video content for specific images, based on parameters provided by a user, including but not limited to, describing the image with textual parameters. Search parameters can include, but are not limited to, text, voice, images, and/or videos.

With the consent of the user (e.g., a user can opt in to the program code accessing the digital wardrobe), elements of a digital wardrobe for a given user can be accessed by one or more servers executing the program code of embodiments of the present invention, via a personal computing device utilized by the user to execute a query via communications of the personal computing device with IoT devices. The program code can monitor the personal computing devices and/or IoT devices with the consent of the user. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, location, temperature, and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor (e.g., a personal computing device utilized by a user to execute a query) can identify the source of the information. Within the IoT, various devices can communicate with each other and can access data from sources available over various communication networks, including the Internet. Thus, based on communicating with the personal computing device of a user, program code executing on one or more servers can obtain digital wardrobe data from the personal computing device, to generate and update the data structure and therefore, to generate the data structure utilized to provide data to index video content to enable textually defined image searching in the video content.

In some embodiments of the present invention, the program code utilizes a neural network to analyze user data and generate the data structures. Neural networks are a biologically-inspired programming paradigm which enable a computer to learn from observational data, in this case, data relevant to a user, including the digital wardrobe of a user and user profile data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns and attributes in data. Because of the speed and efficiency of neural networks, especially when parsing multiple complex data sets, neural networks and deep learning provide solutions to ingesting and organizing data from diverse sources. In fact, neural networks can be used to solve many problems in speech recognition and natural language processing, which are relevant to embodiments of the present invention when cognitively analyzing video and audio content of video in a repository to determine the content and/or context of the audio and video content.

Some embodiments of the present invention may utilize a neural network to predict additional attributes of a user, or of a video created or uploaded by a user, for inclusion in the data structure, based on the inputs provided. Utilizing the neural network, the program code can predict subsequent data. The program code obtains (or derives) the initial attributes from user profile, or a digital wardrobe, to generate an array of values (possible attributes) to input into input neurons of the neural network. Responsive to these inputs, the output neurons of the neural network produce an array that includes the identified attributes as well as the predicted attributes. The neural network can also be utilized to process the data of multiple users simultaneously, and in processing these data, the program code can generate and predict relationships between users for utilization in the data structures. These data structures can then be utilized by the program code to translate text or images in a video, tag the relevant location within the video, and direct a user to a location within the video, which contains the relevant information.

In some embodiments of the present invention, a neuromorphic processor or trained neuromorphic chip can be incorporated into the computing resources executing the program code. One example of a trained neuromorphic chip that can be utilized in an embodiment of the present invention is the IBM® TrueNorth chip, produced by International Business Machines Corporation. IBM® is a registered trademark of International Business Machines Corporation, Armonk, N.Y., U.S.A.

In embodiments of the present invention, the program code can leverage existing repositories, social tags, social connections (including elements of a digital wardrobe) to identify individuals and objects within individual fragments (e.g., shots). In some embodiments of the present invention, the program code requests verification, by a user, of the program code's identification of elements in the video, including but not limited to, people and objects (110), by requesting feedback from a user who uploaded a video to a repository. In some embodiments of the present invention, the program code provides the user with any automatic tagging of entities and requests confirmation on the tagging, for each fragment comprising the video. As discussed below, the program code can segment the video into temporal shots and can request confirmation of tagging by the user who uploaded the video for certain of the fragments. Once a given entity has been validated by an uploader, the program code can automatically tag this entity when located in additional fragments. In some embodiments of the present invention, where the entity being tagged is not the user, the program code can request consent from this entity before automatically tagging the entity. For example, the program code can request contact information for the entity and notify the entity (i.e., individual) that this entity is being tagged in content. Upon receiving confirmation in response to the notification, the program code can automatically tag this entity.

Returning to FIG. 1, the program code plays the video and performs voice/speech to text conversions to extract key entities from the converted text based on the associated timelines (120). The program code comprising the cognitive engine (and/or agent) that performs the cognitive analyses described herein, including converting voice/speech to text can include aspects of an existing cognitive agents, including but not limited to, IBM Watson®. IBM Watson® is a product of International Business Machines Corporation. IBM Watson® is a registered trademark of International Business Machines Corporation, Armonk, N.Y., US. In some embodiments of the present invention, the program code interfaces with IBM Watson® APIs to perform a cognitive analysis of the aforementioned obtained data, in some embodiments of the present invention, the program code interfaces with the application programming interfaces (APIs) that are part of a known cognitive agent, such as the IBM Watson® Application Program Interface (API), a product of International Business Machines Corporation, to determine the context of elements and interpret the elements of the audio and video. For example, aspects of existing cognitive agents, such as IBM Watson® can be utilized to provide speech to text capabilities.

In some embodiments of the present invention, the program code utilizes video playback in order to perform the text to speech conversion (120). During this conversion, the program code can extract key entities from the converted text and associated a video timeline with the speech and the extracted entities.

In some embodiments of the present invention, the program code (of the cognitive engine) builds and indexes textual and video metadata with the associated timelines (130). Building and indexing metadata enables indexing the information to provide the desired search results of the text or images. In some embodiments of the present invention, the program code learns from previous search aggregations to generate patterns for new searches. As part of indexing the video, and in order to create the aforementioned timelines, in embodiments of the present invention, the program code converts the video into individual temporal shots (e.g., fragments). To segment the video in this manner, program code can take advantage of existing approaches for video segmentation, including but not limited to, shot transition. For example, in some embodiments of the present invention, the program code can utilize a shot segmentation algorithm to detect not only whether a shot transition actually occurred but also a precise position where a shot transition occurred in a shot transition candidate interval obtained by performing a color histogram comparison, by using macro block type information or motion vector information. In some embodiments of the present invention, the program code can detect shot transitions by applying a detecting algorithm that use a color histogram between two adjacent frames or two frames apart by a specific time interval from each other an input of the shot segmentation. Once the shots of the video are segmented, the program code can apply already existing image recognition and/or image analytics techniques to extract relevant objects, entities, actors from the video. Thus, the program code segments the video into fragments.

Based on generating indexes for video files and repositories, the program code, responsive to queries provides both search results and recommendations (140). In some embodiments of the present invention, the program code orders search results to provide a recommended video result. As discussed above, a user can search a video for a specific object or a configuration of objects, for example, an image of a specific individual riding a horse. (As discussed above, in some embodiments of the present invention, before indicating to a user the presence of an individual in video media, the program code requests and receives the consent of the individual.) The program code provides recommendations for results, including a location in one or more videos in a repository with potential responsive images. Program code in embodiments of the present invention also provides search results in more flexible formats, including, but not limited to, establishing an order from search responses to provide a single aggregated video response by stitching together extracted relevant sections (defined start/end time) from the video content being searched. For example, search parameters provided are the user are the name of a specific individual and the description that this individual should be riding a bicycle, the program code can generate, as a search results, a new video which is an aggregate of all the segments of video searched in which the individual is riding a bicycle. In this example, in some embodiments of the present invention, in some embodiments of the present invention, if the specific individual has not consented (via email, user interface, etc.) to be found in the media, the program code does not provide this result.

Figure 3:
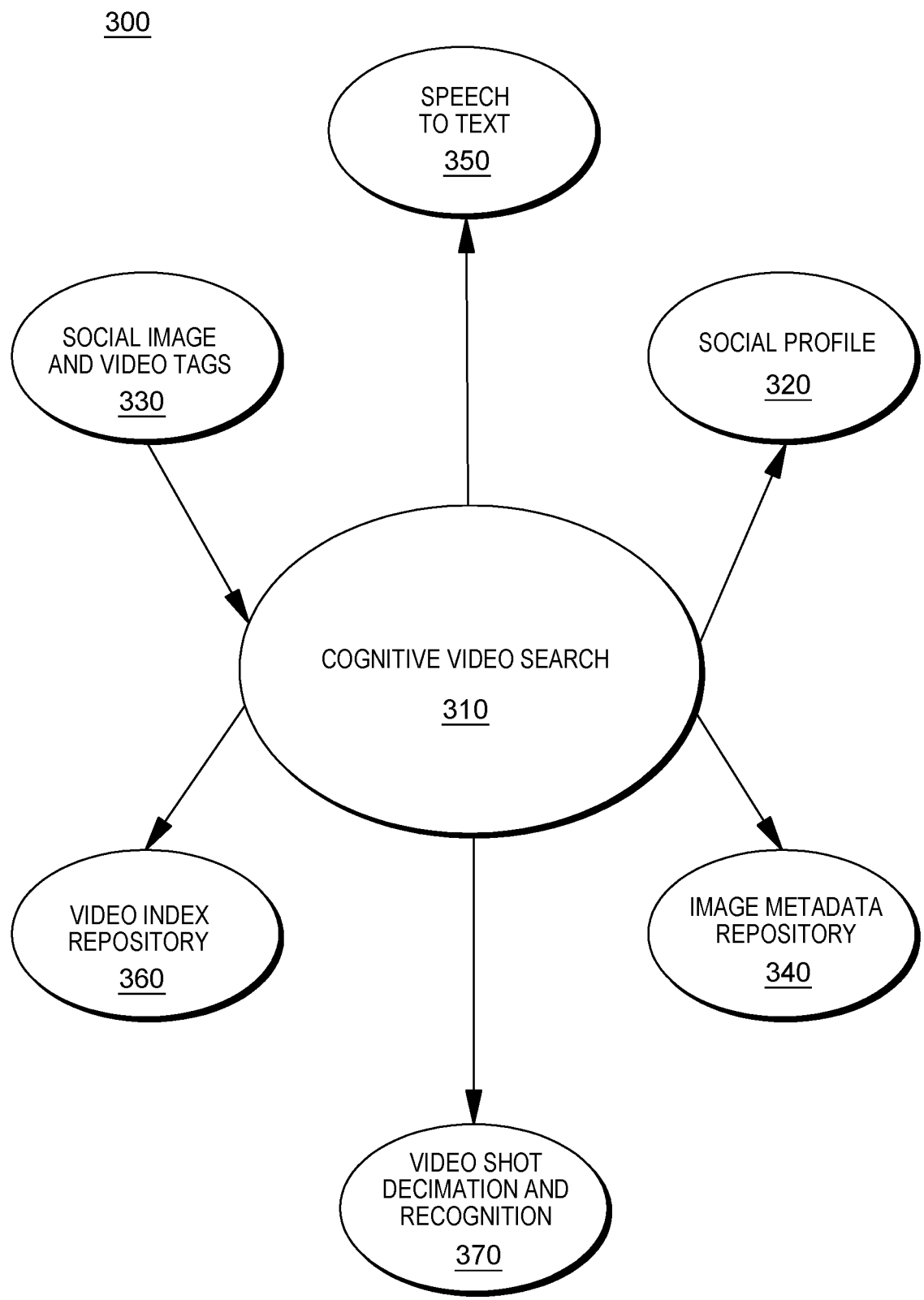
FIG. 3 illustrates various aspects of some embodiments of the present invention.

FIG. 2 illustrates a workflow 200 in which videos are uploaded and processed by the program code to enable the search functionality illustrated in FIG. 3. FIG. 2 illustrates how program code executing on one or more processors in some embodiments of the present invention builds a search index to enable searching of one or more videos. To generate the index, the program code extracts and identifies entities (e.g., actors, objects, locations, etc.) in the one or more videos and links these entities to times within the one or more videos, to enable searching. In some embodiments of the present invention, to index the one or more videos, the program code links start and stop times (encapsulating a fragment with the entities) within the one or more videos to the entities identified by the program code. As discussed in FIG. 1, in some embodiments of the present invention, the entities who are individuals can provide or withhold consent from being provided as search results.

Referring to FIG. 2, in some embodiments of the present invention, program code executing on one or more processors converts one or more videos into temporal shots (e.g., fragments, segments) (210). In order to segment the one or more videos, the program code can utilize existing shot translation capabilities. For example, in some embodiments of the present invention, the program code can utilize automated video scene detection to divide the one or mode videos into semantic scenes (e.g., shots, fragments), utilizing existing technologies, including but not limited to, IBM Watson® Media Video Enrichment. In embodiments of the present invention, the program code can utilize IBM Watson® Video Enrichment to divide the one or more videos into semantic sections by aggregating the audio and video content of the scenes. Various existing shot translation technologies can be utilized in embodiments of the present invention in order to segment the one or more videos into fragments that can be linked to entities, which will provide metadata for searching.

Once the one or more videos are segmented into fragments, the program code extracts entities, including but not limited to, objects, entities, actors, locations, etc., from both the images and the audio associated with the fragments (220). Thus, linked metadata that enables searching of the video content is produced by the program code based on: 1) identifying images, including embedded text, within the fragments; 2) identifying (spoken) entities in audio contemporaneous with the fragments; 3) identifying entities in the fragments based on entities is a user profile of an individual who uploaded the one or more videos; and/or 4) identifying entities in the fragments based on referencing entities extracted by the program code from video content uploaded by the user at an earlier time.

The program code can identify images, including embedded text, within the fragments. In some embodiments of the present invention, the program code, to extract entities from the images (e.g., frames) comprising the fragments, utilizes existing image recognition and/or image analytics techniques (225). As discussed below, the program code links the extracted entities to points in time (segments) in the one or more videos. Image recognition algorithms that can be utilized by the program code in embodiments of the present invention include, but are not limited to, optical character recognition (OCR), pattern matching and gradient matching, facial recognition, license plate matching, and/or scene identification or scene change detection.

The program code can also utilize various machine learning and deep learning techniques to perform this image recognition and analysis, machine learning and deep learning methods can be a useful approach to image recognition, including utilizing a convolutional neural network (CNN). This is only one example of a learning model that can be utilized in embodiments of the present invention and is provided for illustrative purposes and not to suggest any limitations or requirements. CNNs are so-named because they utilize convolutional layers that apply a convolution operation (a mathematical operation on two functions to produce a third function that expresses how the shape of one is modified by the other) to the input, passing the result to the next layer. CNNs are widely used in large-scale (image) recognition systems, giving state-of-the-art results in segmentation, object detection and object retrieval. CNNs can be of any number of dimensions, but most existing CNNs are two-dimensional and process single images. These images contain pixels in a two-dimensional (2D) space (length, width) that are processed through a set of two-dimensional filters in order to understand what set of pixels best correspond to the final output classification. A three-dimensional CNN (3D-CNN) is an extension of the more traditional two-dimensional CNN and a 3D-CNN is typically used in problems related to video classification. 3D-CNNs accept multiple images, often sequential image frames of a video, and use 3D filters to understand the 3D set of pixels that are presented to it.

The program code can identify (spoken) entities in audio contemporaneous with the fragments, In some embodiments of the present invention, the program code extracts entities from the audio that accompanies the images (e.g., frames) comprising the shots or fragments, utilizing one or more cognitive analysis tools, including but not limited to, speech to text capabilities (227). As will be discussed herein, the program code links the extracted entities to points in time (segments) in the one or more videos. In order to analyze the audio data, the program code can utilize application programming interfaces (APIs) that process the audio. The various APIs can include, but are not limited to, a tone analyzer API, a personality insight API, a text to speech API, and a translation API.

In some embodiments of the present invention, the program code extracting entities from the images includes the program code extracting entities based on utilizing OCR to recognize embedded text in the images. Examples of embedded text in video files include, but are not limited to, movie credits can reveal names of actors, director, technicians etc. The program code can leverage image OCR capabilities to extract relevant metadata about the video.

In some embodiments of the present invention, the program code can utilize an existing cognitive agent to identify entities (individuals, events, actors, objects, locations, etc.) in the audio (e.g., speech) in the one or more videos. One such cognitive agent that can be utilized in embodiments of the present invention is IBM Watson®. For example, in some embodiments of the present invention, the program code interfaces with the application programming interfaces (APIs) that are part of a known cognitive agent, such as the IBM Watson® Application Program Interface (API), a product of International Business Machines Corporation, to identify a entities in the audio, including, but not limited to, identifying subjects and/or contexts of the audio in the one or more videos. For example, three APIs that can be utilized in embodiments of the present invention include, but are not limited to IBM Watson® Natural Language Classifier (NLC), IBM Watson® Natural Language Understanding, and IBM Watson® Tone Analyzer. In addition, embodiments of the present invention can utilize certain of the speech to text analysis functionality, including Entity Extraction. The program code converts the audio to text and can then utilize Entity Extraction to extract entities from the textual representations of the audio documents as they are being indexed. Program code in embodiments of the present invention, the program code can utilize a group of APIs referred to as Watson Discovery®. Certain of the APIs in Watson Discovery® can be utilized by the program code in embodiments of the present invention, including NLP capabilities, which the program code can utilize to extract elements from the audio, including but not limited to, sentiment, entities, concepts, and/or semantic roles. In some embodiments of the present invention, APIs utilized by the one or more programs may include, but are not limited to, Retrieve and Rank (i.e., a service available through the IBM Watson® Developer Cloud that can surface the most relevant information from a collection of documents), concepts/visual insights, trade off analytics, document conversion, and/or relationship extraction. As understood by one of skill in the art, the IBM Watson® APIs and other services are only provided to offer an example of possible APIs and existing technologies that can be integrated into embodiments of the present invention and to illustrate the functionality of the program code in embodiments of the present invention, whether through integration of an existing cognitive engine or not.

The program code can utilize Watson's cognitive computing in embodiments of the present invention to generate textual content from the one or more videos by providing voice recognition, machine translation, text to speech, and other semantic tools that enable entity recognition within the audio. The tools utilized to generate textual content may include the IBM Watson® Speech to Text API endpoint. Program code in some embodiments of the present invention process media (videos) through the IBM® Cloud Video Platform, to produce an associated audio. The program code generates a textual representation of the audio by applying a speech to text service to the audio.

The program code can identify entities in the fragments based on entities is a user profile of an individual who uploaded the one or more videos. Returning to FIG. 2, in some embodiments of the present invention, the program code utilizes user profile data of the user who uploaded the one or more videos to generate a baseline list of entities and identifies these entities in fragments in the one or more videos (230). The program code supplements the data linked to the fragments from the image and textual analyses with the personalized entity identifications (240). In some embodiments of the present invention, the program code generates a data structure from available user information, including but not limited to social media profile data and/or tags in the social media and leverages the data structure to provide data to index the video content, to assist in enabling textually defined image searching in the video content. As discussed in FIG. 1, the program code can access various aspects of a digital wardrobe of the user to extract this baseline list.

The program code can identify entities in the fragments based on referencing entities extracted by the program code from video content uploaded by the user at an earlier time. In some embodiments of the present invention, the program code cognitively analyzes the fragments in the one or more videos to identify entities previously identified in previously uploaded videos from the user (250). The program code supplements the data linked to the fragments from the image, textual, and profile analyses with the historical entity identifications (260). In some embodiments of the present invention, the program code utilizes historically extracted entities from prior uploaded videos from the same uploader (owner) that belong to the same video classification and sub-classification.

In some embodiments of the present invention, the program code displays, through a user interface, to the user who uploaded the one or more videos, a list of the extracted entities (from the image, speech-to-text audio, user profile, and historical video cognitive analyses) and the linkages of the extracted entities with the fragments (i.e., temporal shots) to solicit feedback from the user regarding the entities extracted and the linkages (270). Based on obtaining feedback correcting certain if the entity identifications, the program code revises the cognitive analyses (e.g., the algorithms utilized in the cognitive analyses) to be more accurate moving forward (280).

In embodiments of the present invention, the program code generates a search index for the one or more videos based on linking the extracted entities (extracted based on image analysis, textual analysis of converted audio, user profile analysis (e.g., with the consent of the user), and/or historical entity extraction analysis) to specific video fragments (e.g., temporal shots) (290). The shots and/or video fragments to which each entity is linked each comprise a defined start and end time. In some embodiments of the present invention, each linkage for an entity includes a start time and a stop time within the timeline of the video to which the entity is linked.

FIG. 3 is an illustration 300 of various aspects that enables the indexing of one or more videos for searching, as described in the workflow of FIG. 2. As illustrated in FIG. 3, a cognitive video search 310 is enabled by the program code extracting entities and linking the entities to segments of the video in order to generate a search index. In order to extract entities, as explained with FIG. 2, the program code utilizes external data to cognitively analyze the video, including but not limited to user profile elements, including, in this example, a social profile 320 of the individual who uploaded the video, and social image and video tags 330 associated with the individual. The program code can also utilize an image metadata repository 340 to gain external intelligence in order to identify various entities within the video. The program code utilizes a speech to text 350 facility in order to extract entities from the audio in the video. As discussed above the program code utilizes video shot decimation and recognition 350 to segment the video such that the extracted entities can be linked to fragments (shots, distinct segments). In embodiments of the present invention, the program code generates a video index for each video and saves the index in a video index repository 360, for utilization in searching.

FIG. 4 illustrated a workflow 400 related to searching the previously uploaded content. As discussed above, in embodiments of the present invention, the program code can search one or more videos, which have been indexed in accordance with the aspects described in FIG. 2, utilizing one or more of text, voice, image(s), and/or other videos, as search inputs. Particular examples of types of searches that can be executed were described earlier (i.e., finding a movie where a particular actor is smiling, finding a video clip with a particular family member riding a horse at a particular geographic location, finding educational content in a team room and prerequisites to watching the content). In some embodiments of the present invention, a user initiates a query by providing search parameters to program code executing on at least one processing device as one or more of text, voice, image(s), and/or other videos (410). The program code obtains the parameters and identifies relevant entities from the provided search input and utilizes the identified relevant entities to search an indexed repository for video results (420).

The program code can provide search results in more than one manner. In some embodiments of the present invention, the program code ranks the search results based on relevance to the parameters (e.g., search terms) (430).

In embodiments of the present invention, the program code can be configured to provide different types of results. The program code provides results based on the configuration (435). In some embodiments of the present invention, the program code provides the ranked results to the user responsive to the query (440). Results provided by the program code comprise specific and relevant video fragments (shots) in the response. In some embodiments of the present invention, the program code generates the response by physically fragmenting the original videos to create a video response with fragments that are responsive to the query (fragments linked to the identified entities) or utilizing a special logic, which plays only the relevant fragments, while playing the video to play from specific start and end times. In some embodiments of the present invention, responsive to a given search, the program code identifies a identify relationship and ordering within search results. Thus, the program code can provide a single aggregated video response can be provided back to the user (e.g., video responses of a multi-year television series can be chronologically arranged by year and episode).

In some embodiments of the present invention, the program code provides one or more pieces of newly generated media as search results. As in the example above, the program code ranks the search results based on relevance to the parameters (e.g., search terms) (430). The program code generates a new video from the specific and relevant video fragments (shots) comprising the search results (445). The program code provides the new video to the user as a search result (455). In some embodiments of the present invention, the program code can automatically play the search result (the new video) in a graphical user interface on a computing device utilized by the user. In some embodiments of the present invention, rather than generate a single new video, the program code produces multiple results, all of which are individual new videos, which the program code ranks and returns to the user, ranked. The program code could provide different fragments stitched together in different ranked results and/or videos with the same fragments stitched together in different orders. In individual videos, the order of video fragments stitched together to generate the new media can be in accordance with the relevance of the fragments to the search parameters. In some embodiments of the present invention, the program code does not rank results and generates new media as the response in the order of the timeline in the original video being searched.

As illustrated in FIG. 4, the program code can provide one or more of the enumerated result types, in various embodiments of the present invention.

Figure 5A:
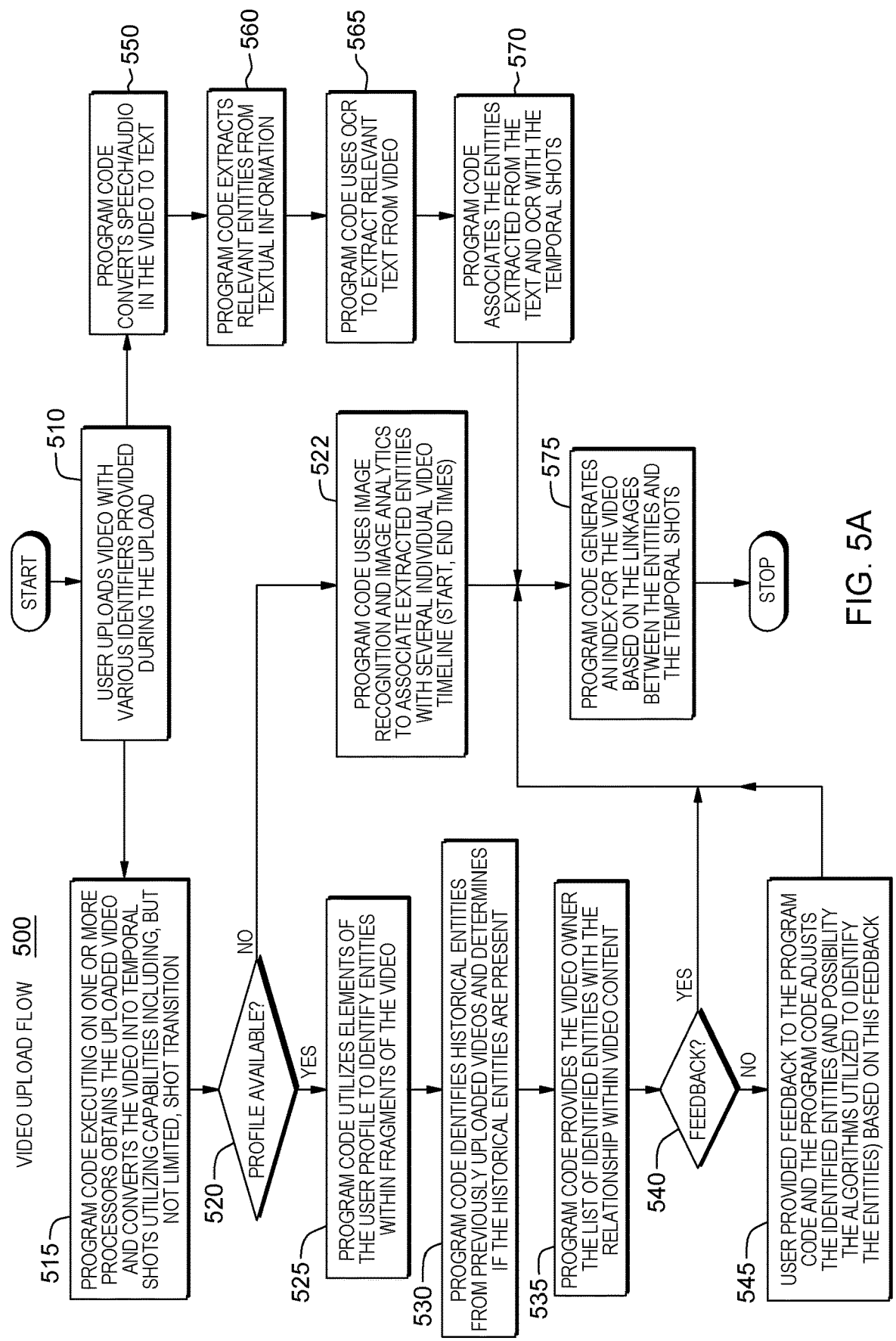
FIGS. 5A-5B are a workflow that illustrate certain aspects of some embodiments of the present invention.
Figure 5B:
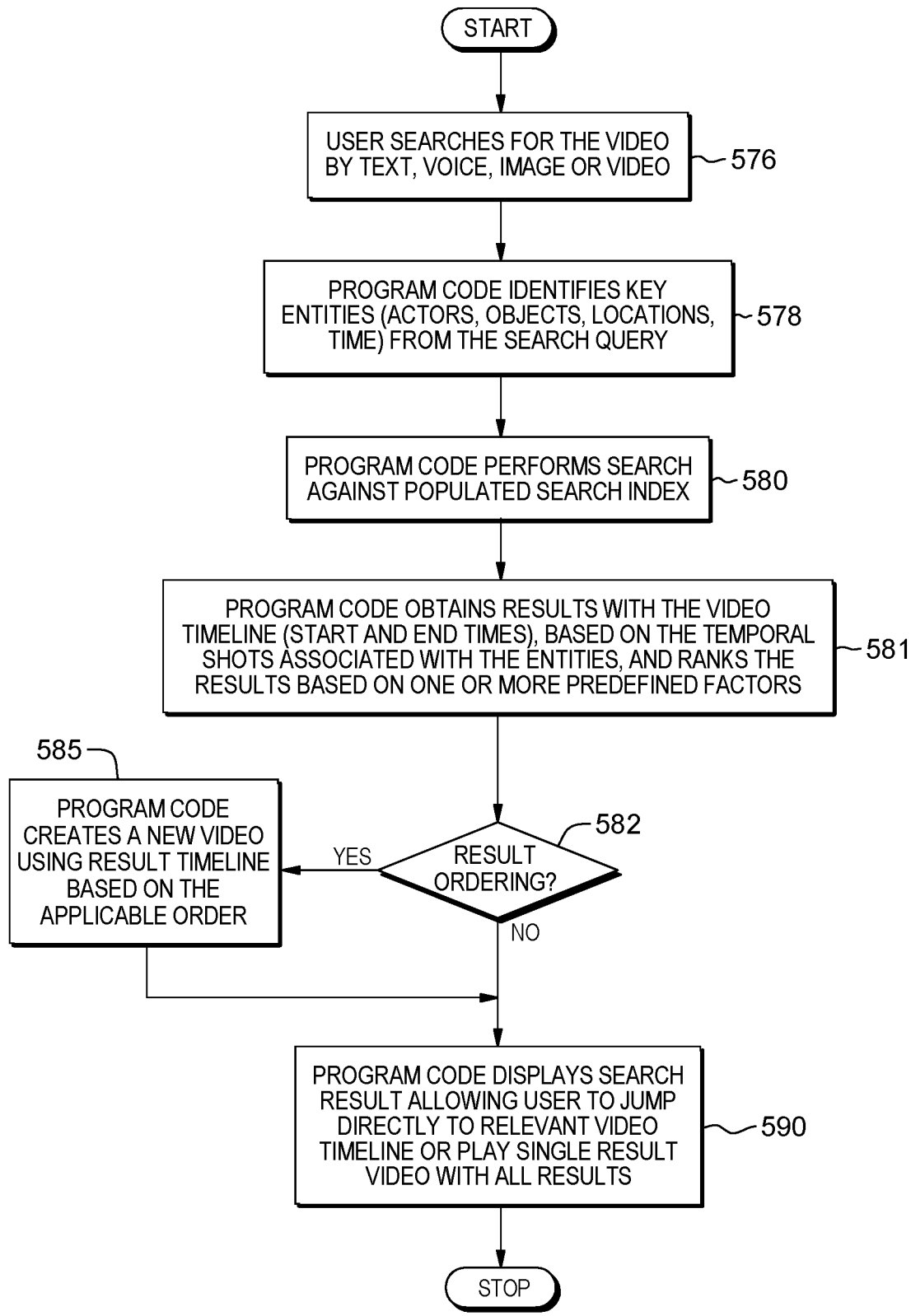

FIGS. 5A and 5B illustrate two different workflows 500 505 in some embodiments of the present invention: generating a search index (e.g., video upload flow 500) and executing a search (e.g., video search flow 505), once the index has been generated, in some embodiments of the present invention. The processes are visually separated into FIGS. 5A and 5B, but provided within the same numbering of a drawing for illustrative purposes.

In FIG. 5A, the program code indexes one or more videos in the video upload flow 500. As demonstrated in FIG. 5A, certain of the aspects of this workflow 500 can be performed concurrently. This workflow commences in some embodiments of the present invention when a user uploads video with various identifiers provided during the upload (510). In some embodiments of the present invention, the identifiers can include a classification (e.g., education) and a sub-classification (e.g., specific technology, television series). Program code executing on one or more processors obtains the uploaded video and converts the video into temporal shots utilizing capabilities including, but not limited to, shot transition (515). The program code determines whether a user profile (e.g., social media profile, digital wardrobe, etc.) is available for the user (520). Based on determining that a profile is available, the program code utilizes elements of the user profile (e.g., information from a social network about the user, social network profile image, social image/video tags) to identify entities within fragments of the video (525). The program code identifies historical entities from previously uploaded videos by the user of the same classification and/or sub-classification and searches the fragments of the video to determine if the historical entities are present (530). In some embodiments of the present invention, the program code provides, through an interface, the user with a list of identified entities (in this embodiment, those identified utilizing the user profile elements and historical entities from related vides) (535) and requests feedback regarding these identified entities (540). The user provides the feedback to the program code and the program code adjusts the identified entities (and possibility the algorithms utilized to identify the entities) based on this feedback (545).

In some embodiments of the present invention, the program code determines that the a profile is not available and utilizes image recognition and image analytics to extract and identify entities within the video and associate the extracted entities with the temporal shots, including tying each identified entity to a place in the video timeline (e.g., start and end times) (522). In this embodiment of the present invention, utilizing image recognition and image analytics is presented as an alternative to identity identification utilizing a user profile, however, in some embodiments of the present invention, the program code performs both of these analyses to identify entities within a video that it later utilizes to create an index.

In some embodiments of the present invention, the program code converts speech/audio in the video to text (550). As illustrated in FIG. 5A, this conversion and various other aspects can be performed contemporaneously with other aspects, including but not limited to, utilizing the user profile (525) and historical entities (530) to identify entities within temporal shots of a video, as well as performing image recognition and analytics (522) to identify entities. This contemporaneous timing is one example of a possible configuration as different aspects can be performed contemporaneously and certain aspects can be performed in sequence, depending on the configuration of the various aspects in embodiments of the present invention. Based on converting the speech (or other audio or the video) to text, the program code extracts entities from the text (560). In some embodiments of the present invention, the program code will extract only entities that are adjudged by the program code as being relevant, meaning that they appear a threshold number of times in the video, such that they can be identified as keywords. In some embodiments of the present invention, the program code utilizes OCR to extract entities from relevant text embedded within the video (565). The program code associates the entities extracted from the text and through OCR with the temporal shots or fragments (i.e., positions on the timeline of the video, with a start time and a stop time) (570).

Based on having identified entities utilizing one or more of the user profile, historical entities, image recognition and analytics, user feedback, natural language processing, and/or OCR, the program code generates an index for the video based on the linkages between the entities and the temporal shots (575). Thus, each entity is indexed on a timeline of the video.

Referring to FIG. 5B, once a video has been indexed, the video content can be searched. The video search flow 505 commences with a user searching for video utilizing, as search parameters, one or more of text, voice, image, and/or video (576). The program code identifies key entities (e.g., actors, objects, locations, times, etc.) from the search query (578). The program code performs the search against the search index (generated by the video upload flow 500) (580). The program code obtains results with the video timeline (start and end times), based on the temporal shots associated with the entities, and ranks the results based on one or more predefined factors (e.g., relevance, number of matching entities, etc.) (581). In some embodiments of the present invention, the program code can utilize algorithms, such as IBM Watson® Retrieve and Rank, to rank the returned results.

In some embodiments of the present invention, the program code determines that a given ordering of the results is responsive to the search parameters (582). Based on this determination, the program code generates a new video using a result timeline, based on the applicable order (585). If the program code does not determine an order for the results, the program code displays each result to the user in a manner that enables the user to navigate directly to relevant video in the timeline or play single result video with all results (590). In some embodiments of the present invention, the program code can generate the new video (585) in addition to displaying each results and enabling navigation of the timeline (590).

Embodiments of the present invention include a computer-implemented method, a computer program product, and a computer system where program code executing on at least one processor obtains, from a user, via a client, a video to upload to a repository accessible to the one or more processors. The program code segments the video into temporal shots, where the temporal shots comprise a timeline of the video. The program code cognitively analyzes the video, by applying an image recognition algorithm, to the video, to identify image entities in each temporal shot of the video. The program code cognitively analyzes by applying a data structure comprising a user profile of the user to the temporal shots, to identity personal entities in each temporal shot of the video. The program code generates a search index for the video, utilizing the user entities, where the user entities comprise the image entities and the personal entities, where each entry of the search index comprises a given user entity, where the given user entity is selected from the user entities, and a linkage to a given temporal shot of the temporal shots, where the linkage indicates a location of the given entity in the timeline of the video.

In some embodiments of the present invention, the program code applying the user profile comprises: the program code monitoring computing activities performed by the user, via the client, based on the client connecting, over a network, to one or more applications; the program code analyzing the computing activities performed by the user, in the one or more applications, to identify data comprising elements relevant to the user and relationships between the elements and the user; and the program code generating based on the analyzing, the data structure, where the data structure comprises the user profile.##

In some embodiments of the present invention, the program code applying the user profile comprises: the program code converting non-textual elements in the video to textual content, for each temporal shot of the temporal shots; and the program code identifying in the textual content of each temporal shot, the elements relevant to the user and the relationships between the elements and the user, where the elements comprise the personal entities.

In some embodiments of the present invention, the program code stores the search index in an indexed repository.

In some embodiments of the present invention, the program code obtains search parameters identifying one or more relevant user entities of the user entities in the search index. The program code identifies the relevant user entities. The program code searches the video for the relevant user entities, where the searching comprises accessing the index repository to utilize the search index to locate the relevant user entities in the video.

In some embodiments of the present invention, the program code formulates, responsive to the searching search results, where the search results comprise the relevant user entities and for each relevant user entity, a location of the relevant user entity in the timeline, where the location comprises a start time and an end time.

In some embodiments of the present invention, the program code formulating the search results comprises ranking the search results based on relevance to the search parameters.

In some embodiments of the present invention, the program code generates a search deliverable, the generating comprising: the program code obtaining a portion of the temporal shots from the video, where each temporal shot of the portion comprises the location of the relevant user entity in the timeline for each relevant user entity; and the program code assembling the portion of the temporal shots into a new video.

In some embodiments of the present invention, the program code provides the search deliverable to the user, via the client.

In some embodiments of the present invention, the program code assembling comprises the program code assembling the portion of the temporal shots according to the ranking of the search results based on the relevance to the search parameters.

In some embodiments of the present invention, the new video comprises more than one individual new videos, and where the providing of the search deliverable comprises providing links to each of the individual new videos.

In some embodiments of the present invention, a format of the search parameters are selected from the group consisting of: text, voice, image, and video.

In some embodiments of the present invention, the program code applying the image recognition algorithm comprises the program code accessing an image metadata repository accessible to the one or more processors.

In some embodiments of the present invention, the non-textual elements comprise speech and audio, and converting the elements comprises the program code applying a speech to text processing algorithm to produce the textual content.

In some embodiments of the present invention, the non-textual elements comprise embedded text in images comprising the video, and the program code converting the elements comprises the program code executing an optical character recognition process on the embedded text to convert the embedded text to the textual content.

In some embodiments of the present invention, prior to generating the search index, the program code determines a classification for the video, and the program code obtaining the video from the user, via the client, further comprises the program code obtaining the classification, from the user via the client. The program code identifies n the repository, another video uploaded by the user, where the classification of the other video is equivalent to the classification of the video. The program code extracts, from a search index of the other video, user entities comprising the search index of the other video. The program code searches the video, for the user entities comprising the search index of the other video. The program code locates a portion of the user entities comprising the search index of the other video in the video.

In some embodiments of the present invention, the user entities further comprise the portion of the user entities.

In some embodiments of the present invention, prior to generating the search index, the program code generates, in a user interface of the client, an interface displaying the personal entities and respective linkages of the personal entities, where the interface comprises a point of entry by which the user can provide feedback. The program code obtains the feedback from the user, provided via the interface. The program code updates the user entities based on the feedback.

In some embodiments of the present invention, the one or more applications comprise a social media website.

In some embodiments of the present invention, the elements relevant to the user comprise images posted by the user on a social media website and tags associated with the images.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the program code performing aspects of the workflow 500 505 (FIGS. 5A-5B) as well as the video repository housing the uploaded content and the computing device housing the indexing, can each be understood as a cloud computing node 10 (FIG. 6) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 6, computer system/server 12 that can be utilized as cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
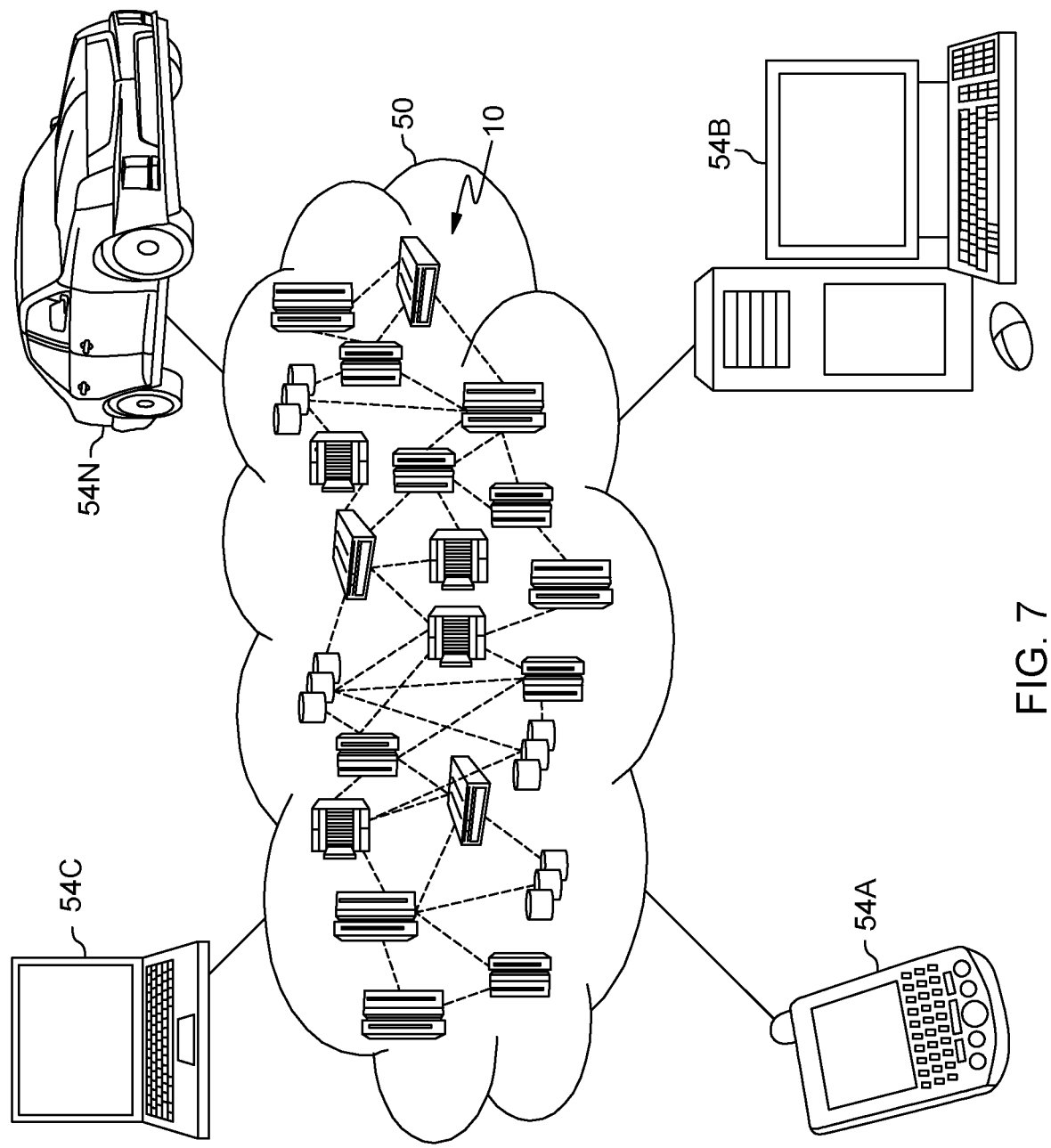
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
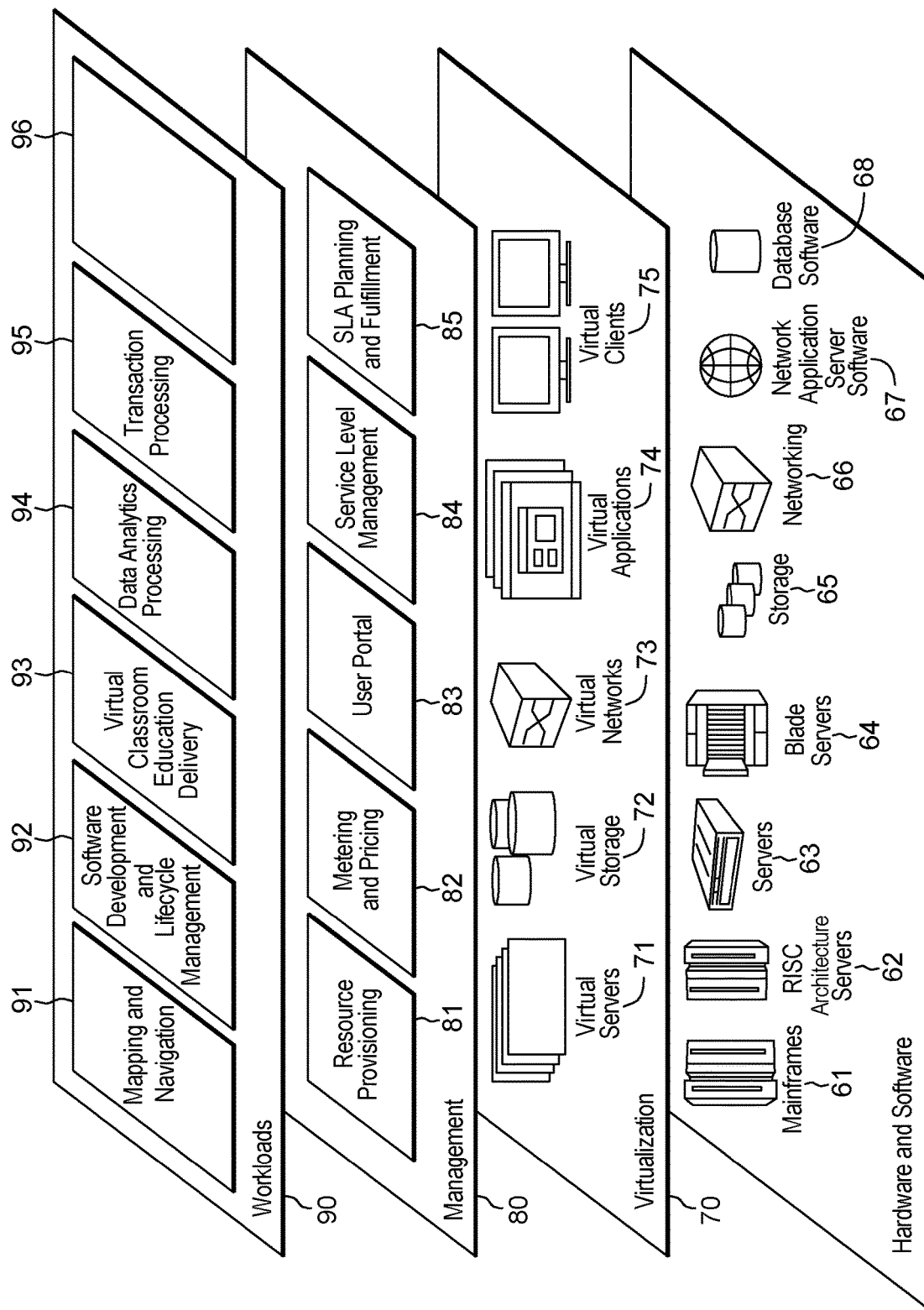
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; maintaining session continuity during periods of inactivity within the session 96.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, from a user, via a client, a video to upload to a repository accessible to the one or more processors;
   segmenting, by the one or more processors, the video into temporal shots, wherein the temporal shots comprise a timeline of the video;

identifying, by the one or more processors, image entities in the temporal shots, wherein the identifying comprises:
  cognitively analyzing, by the one or more processors, the video, by applying an image recognition algorithm, to the video, to identify at least a portion of the image entities in each temporal shot of the video; and
  based on cognitively analyzing the video by applying the image recognition algorithm, cognitively analyzing, the video, by the one or more processors, by applying a data structure comprising a user profile of the user to the temporal shots, to automatically add context that assists the image recognition algorithm in identifying the image entities not identified by cognitively analyzing the video, by applying an image recognition algorithm and to identify personal entities in each temporal shot of the video;
generating, by the one or more processors, a search index for the video, utilizing user entities, wherein the user entities comprise the image entities and the personal entities, wherein each entry of the search index comprises a given user entity, wherein the given user entity is selected from the user entities, and a linkage to a given temporal shot of the temporal shots, wherein the linkage indicates a location of the given user entity in the timeline of the video;
searching, by the one or more processors, the video for relevant user entities, wherein the searching comprises utilizing the search index to locate the relevant user entities in the video; and
formulating, responsive to the searching, by the one or more processors, search results, wherein the search results comprise the relevant user entities and for each relevant user entity, a location of the relevant user entity in the timeline, wherein the location comprises a start time and an end time, and wherein the search results comprise the automatically added context for the relevant user entities.

2. The computer-implemented method of claim 1, wherein applying the user profile comprises:
  monitoring, by the one or more processors, computing activities performed by the user, via the client, based on the client connecting, over a network, to one or more applications;
  analyzing, by the one or more processors, the computing activities performed by the user, in the one or more applications, to identify data comprising elements relevant to the user and relationships between the elements and the user; and
  generating, by the one or more processors, based on the analyzing, the data structure, wherein the data structure comprises the user profile.

3. The computer-implemented method of claim 2, wherein applying the user profile further comprises:
  converting, by the one or more processors, non-textual elements in the video to textual content, for each temporal shot of the temporal shots; and
  identifying, by the one or more processors, in the textual content of each temporal shot, the elements relevant to the user and the relationships between the elements and the user, wherein the elements comprise the personal entities.

4. The computer-implemented method of claim 1, further comprising:
  storing, by the one or more processors, the search index in an indexed repository.

5. The computer-implemented method of claim 4, further comprising:
  obtaining, by the one or more processors, search parameters identifying one or more relevant user entities of the user entities in the search index;
  identifying, by the one or more processors, the relevant user entities; and
  wherein the searching comprises accessing the index repository.

6. The computer-implemented method of claim 5, wherein formulating the search results comprises ranking the search results based on relevance to the search parameters.

7. The computer-implemented method of claim 6, further comprising:
  generating, by the one or more processors, a search deliverable, the generating comprising:
    obtaining, by the one or more processors, a portion of the temporal shots from the video, wherein each temporal shot of the portion comprises the location of the relevant user entity in the timeline for each user relevant entity; and
    assembling, by the one or more processors, the portion of the temporal shots into a new video.

8. The computer-implemented method of claim 7, further comprising:
  providing, by the one or more processors, the search deliverable to the user, via the client.

9. The computer-implemented method of claim 7, wherein the assembling comprises assembling the portion of the temporal shots according to the ranking of the search results based on the relevance to the search parameters.

10. The computer-implemented method of claim 9, wherein the new video comprises more than one individual new videos, and where the providing of the search deliverable comprises providing links to each of the individual new videos.

11. The computer-implemented method of claim 5, wherein a format of the search parameters is selected from the group consisting of: text, voice, image, and video.

12. The computer-implemented method of claim 1, wherein applying the image recognition algorithm comprises accessing an image metadata repository accessible to the one or more processors.

13. The computer-implemented method of claim 3, wherein the non-textual elements comprise speech and audio, and wherein converting the elements comprises applying a speech to text processing algorithm to produce the textual content.

14. The computer-implemented method of claim 3, wherein the non-textual elements comprise embedded text in images comprising the video, wherein converting the elements comprises executing an optical character recognition process on the embedded text to convert the embedded text to the textual content, wherein the one or more applications comprise a social media website, and wherein the elements relevant to the user comprise images posted by the user on a social media website and tags associated with the images.

15. The computer-implemented method of claim 1, further comprising:
  prior to generating the search index, determining, by the one or more processors, a classification for the video, wherein obtaining the video from the user, via the client, further comprises obtaining the classification, from the user via the client;

identifying, by the one or more processors, in the repository, another video uploaded by the user, wherein the classification of the other video is equivalent to the classification of the video;

extracting, by the one or more processors, from a search index of the other video, user entities comprising the search index of the other video;

searching, by the one or more processors, the video, for the user entities comprising the search index of the other video; and locating, by the one or more processors, a portion of the user entities comprising the search index of the other video in the video.

16. The computer-implemented method of claim 15, wherein the user entities further comprise the portion of the user entities.

17. The computer-implemented method of claim 1, further comprising:

prior to generating the search index, generating, by the one or more processors, in a user interface of the client, an interface displaying the personal entities and respective linkages of the personal entities, wherein the interface comprises a point of entry by which the user can provide feedback;

obtaining, by the one or more processors, the feedback from the user, provided via the interface; and updating, by the one or more processors, the user entities based on the feedback.

18. The computer-implemented method of claim 1, further comprising:

soliciting, by the one or more processors, based on the search results, feedback from the user;

obtaining, by the one or more processors, responsive to the soliciting, the feedback, via a user interface; and updating, by the one or more processors, the image recognition algorithm, based on the feedback.

19. A computer program product comprising:

a computer readable storage medium readable by one or more processors and storing instructions for execution by the one or more processors for performing a method comprising:

obtaining, by the one or more processors, from a user, via a client, a video to upload to a repository accessible to the one or more processors;

segmenting, by the one or more processors, the video into temporal shots, wherein the temporal shots comprise a timeline of the video;

identifying, by the one or more processors, image entities in the temporal shots, wherein the identifying comprises:

cognitively analyzing, by the one or more processors, the video, by applying an image recognition algorithm, to the video, to identify at least a portion of the image entities in each temporal shot of the video; and based on cognitively analyzing the video by applying the image recognition algorithm, cognitively analyzing, the video, by the one or more processors, by applying a data structure comprising a user profile of the user to the temporal shots, to automatically add context that assists the image recognition algorithm in identifying the image entities not identified by cognitively analyzing the video, by applying an image recognition algorithm and to identify personal entities in each temporal shot of the video;

generating, by the one or more processors, a search index for the video, utilizing user entities, wherein the user entities comprise the image entities and the personal entities, wherein each entry of the search index comprises a given user entity, wherein the given user entity is selected from the user entities, and a linkage to a given temporal shot of the temporal shots, wherein the linkage indicates a location of the given user entity in the timeline of the video;

generating, by the one or more processors, a search index for the video, utilizing user entities, wherein the user entities comprise the image entities and the personal entities, wherein each entry of the search index comprises a given user entity, wherein the given user entity is selected from the user entities, and a linkage to a given temporal shot of the temporal shots, wherein the linkage indicates a location of the given user entity in the timeline of the video;

searching, by the one or more processors, the video for relevant user entities, wherein the searching comprises utilizing the search index to locate the relevant user entities in the video; and formulating, responsive to the searching, by the one or more processors, search results, wherein the search results comprise the relevant user entities and for each relevant user entity, a location of the relevant user entity in the timeline, wherein the location comprises a start time and an end time, and wherein the search results comprise the automatically added context for the relevant user entities.

20. A system comprising:

a memory;

one or more processors in communication with the memory;

program instructions executable by the one or more processors via the memory to perform a method, the method comprising:

obtaining, by the one or more processors, from a user, via a client, a video to upload to a repository accessible to the one or more processors;

segmenting, by the one or more processors, the video into temporal shots, wherein the temporal shots comprise a timeline of the video;

identifying, by the one or more processors, image entities in the temporal shots, wherein the identifying comprises:

cognitively analyzing, by the one or more processors, the video, by applying an image recognition algorithm, to the video, to identify at least a portion of the image entities in each temporal shot of the video; and based on cognitively analyzing the video by applying the image recognition algorithm, cognitively analyzing, the video, by the one or more processors, by applying a data structure comprising a user profile of the user to the temporal shots, to automatically add context that assists the image recognition algorithm in identifying the image entities not identified by cognitively analyzing the video, by applying an image recognition algorithm and to identify personal entities in each temporal shot of the video;

generating, by the one or more processors, a search index for the video, utilizing user entities, wherein the user entities comprise the image entities and the personal entities, wherein each entry of the search index comprises a given user entity, wherein the given user entity is selected from the user entities, and a linkage to a given temporal shot of the temporal shots, wherein the linkage indicates a location of the given user entity in the timeline of the video;

searching, by the one or more processors, the video for relevant user entities, wherein the searching comprises utilizing the search index to locate the relevant user entities in the video; and formulating, responsive to the searching, by the one or more processors, search results, wherein the search results comprise the relevant user entities and for each relevant user entity, a location of the relevant user entity in the timeline, wherein the location comprises a start time and an end time, and wherein the search results comprise the automatically added context for the relevant user entities.

\* \* \* \* \*